US007676551B1

(12) United States Patent
Dalia et al.

(10) Patent No.: US 7,676,551 B1
(45) Date of Patent: Mar. 9, 2010

(54) LOOKUP PARTITIONING STORAGE SYSTEM AND METHOD

(75) Inventors: Apurva F. Dalia, Kirkland, WA (US); Craig Allen Harry, WakeForest, NC (US); Nishant Dani, Issaquah, WA (US); Shan Jiang, Bellevue, WA (US); Brad Dean Thompson, Woodinville, WA (US); Bradley J. Barrows, Redmond, WA (US); David R. Shutt, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1707 days.

(21) Appl. No.: 10/606,626

(22) Filed: Jun. 25, 2003

(51) Int. Cl.
 *G06F 15/16* (2006.01)
(52) U.S. Cl. .................. 709/218; 709/223; 709/226
(58) Field of Classification Search ................... 709/225
 See application file for complete search history.

(56) References Cited

U.S. PATENT DOCUMENTS

| 6,286,001 | B1* | 9/2001 | Walker et al. ................. 707/9 |
| 6,351,775 | B1* | 2/2002 | Yu ............................... 709/238 |
| 6,842,784 | B1* | 1/2005 | Black ......................... 709/225 |
| 6,857,012 | B2* | 2/2005 | Sim et al. .................... 709/222 |
| 7,444,414 | B2* | 10/2008 | Foster et al. ................. 709/229 |
| 7,587,426 | B2* | 9/2009 | Fujiwara et al. ............. 707/200 |
| 2001/0037379 | A1* | 11/2001 | Livnat ........................ 709/219 |
| 2002/0156887 | A1* | 10/2002 | Hashimoto .................. 709/224 |
| 2003/0014503 | A1* | 1/2003 | Legout et al. ............... 709/219 |

OTHER PUBLICATIONS

Krishnamurthy, Balachander et al. "On the Use and Performance of Content Distribution Networks." Proceedings of the 1st ACM SIGCOMM Workshop on Internet Measurement. ACM Press. Nov. 2001. 169-82.*

Wang, Limin et al. "The Effectiveness of Request Redirection on CDN Robustness." ACM SIGOPS Operating Systems Review. ACM Press. vol. 36 Issue SI. Dec. 2002. 345-60.*

(Continued)

*Primary Examiner*—Vivek Srivastava
*Assistant Examiner*—Jeffrey R Swearingen
(74) *Attorney, Agent, or Firm*—Lee & Hayes, PLLC

(57) ABSTRACT

A method, system, and computer-readable medium for accessing and managing an online storage system is disclosed. Access to a storage resource in a multiple server storage system is provided by sending to a lookup partitioning service server a resource identifier that is associated with a storage resource stored in a particular storage partition of a storage server. The LPS returns the looked-up partition that stores the storage resource associated with the resource identifier. Access to the storage resource is then enabled to the looked-up storage partition.

20 Claims, 10 Drawing Sheets

OTHER PUBLICATIONS

Mogi, Kazuhiko et al. "Hot mirroring: A method of hiding parity update penalty and degradation during rebuilds for RAID5." Proceedings of the 1996 ACM SIGMOD international conference on Management of data. ACM Press. vol. 25 Issue 2. Jun. 1996. 183-94.*

Azar, Y., et al., "Balanced Allocations," *Slam J. Comput.* 29(1):180-200, 1999.

Brodsky, D., et al., "Using File-Grain Connectivity to Implement a Peer-to-Peer File System," *Proceedings of the 21st IEEE Symposium on Reliable Distributed Systems*, Osaka, Japan, Oct. 13-16, 2002, 6 pages.

Dabek, F., et al., "Building Peer-to-Peer Systems With Chord, a Distributed Lookup Service," *Proceedings of the 8th Conference on Hot Topics in Operating Systems*, Elmau/Oberbayern, Germany, May 2001, pp. 81-86.

Ratnasamy, S., et al., "A Scalable Content-Addressable Network," *Proceedings of ACM SIGCOMM 2001*, San Diego, California, Aug. 2001, pp. 27-31.

Rowstron, A., and P. Druschel, "Storage Management and Caching in PAST, a Large-Scale, Persistent Peer-to-Peer Storage Utility," *Proceedings of the 18th ACM Symposium on Operating Systems Principles*, Lake Louise, Canada, Oct. 21-24, 2001, pp. 188-201.

* cited by examiner

LOOKUP PARTITIONING STORAGE SYSTEM AND METHOD

FIELD OF THE INVENTION

The present invention relates in general to online storage and in particular to a system and method for providing access to online storage in a configurable and efficient manner.

BACKGROUND OF THE INVENTION

Networks are well known in the computer field. By definition, a network is a group of computers and associated devices that are connected by communication facilities or links. An internetwork, in turn, is the joining of multiple computer networks, both similar and dissimilar, by means of gateways or routers that facilitate data transfer and conversion from the multiple computer networks. A well known abbreviation for the term internetwork is "internet." As currently understood, the capitalized term "Internet" refers to the collection of networks and routers that use the Internet Protocol to communicate with one another. The Internet has recently seen increased growth by virtue of its ability to link computers located throughout the world. As will be better appreciated from the following description, embodiments of the present invention could find use in many network environments; however, for purposes of discussion, the Internet is used as an exemplary network environment for implementing embodiments of the present invention.

The Internet has quickly become a popular method of disseminating information due in large part to its ability to deliver information quickly and reliably. To retrieve stored resources or other data over the network, a user typically uses communications or network browsing software. A common way of retrieving storage resources is to use such communications or network browsing software to access storage resources at a uniform resource identifier ("URI") address, such as a uniform resource locator ("URL") address, that indicates the location of a storage resource on a server connected to the network.

Storage systems for computing devices are also well known in the computing field. Software applications and operating systems generally have access to some form of storage. Such storage may include hard drives, solid state memory, removable storage devices, etc. Most conventional computing devices have local storage. However, as the use of networks and network applications increases, so has the use of online storage that is remote from computing devices. One form of conventional online storage system is a file server in which computing devices are able to store and retrieve files. A more sophisticated form of online storage employs multiple file servers some of which may replicate other servers in order to provide redundancy in the event the main file server becomes inoperable or inaccessible While single and multiple file servers accessible by computing devices in networks have solved some of the problems of accessing online storage resources, such file servers are not designed to efficiently control and route accesses to particular resources, such as a particular user's address book, for example. As network accessible applications proliferate, so has the need for storing online resources at separate locations associated with particular network accessible applications and the users of such applications.

More specifically, advanced network applications usually accesses storage resources at a remote server over the Internet. As the Internet (and other networks) has developed, some of the functions that were formerly performed by applications running on client devices are now provided by applications running on network accessible servers. One such example is a Web-based e-mail network application. In a network accessible e-mail application, e-mails and address book information are stored on remote servers. Remote server storage eliminates the need for a user to export or synchronize their e-mail information when the user changes to a new device and/or adds a new device to the user's inventory of devices. Unfortunately, previously developed remote file servers, in particular multiple remote file servers, accessible by network applications have not provided an efficient storage system for such user dependent applications. User dependent applications, such as e-mail applications access separate online storage resources. In the past, multiple file servers have not provided enough flexibility to grow and adapt while still maintaining efficient access (or routing) to storage resources.

Some previously developed on-line file servers have used rigid hash-based allocations to segment where online storage resources should be saved. Rigid segmentation is inflexible and does not provide sufficiently fine "granularity" (level of control) when accessing resources stored in on-line servers. If a particular server is under-utilized, a rigid hash-based load balancing system is not able to efficiently adjust its load assignments to increase the load on the under utilized server. Still further, moving storage resources with such hash-based allocations requires locking entire hash buckets, which increases the difficulty of moving resource for end-users.

Accordingly, there is a need for an improved method of accessing and managing online storage systems that is efficient and sufficiently granular. It is desirable that such a method provide information in an application independent manner.

SUMMARY OF THE INVENTION

Embodiments of present invention relate to a method, system, and computer-readable medium for accessing and managing an online storage system. In accordance with one aspect of the present invention, a method for accessing and managing a resource stored in a multiple remote file server system is provided. In accordance with this aspect of the present invention, a resource identifier is sent by a client device to a remotely located lookup partitioning service ("LPS") server, via another server such as a front end server. The resource identifier is associated with a resource stored in a particular storage partition of a particular storage file server of the multiple remote file server system. The LPS server returns a looked up storage server location, i.e., a location that identifies the particular storage partition in the particular storage file server, to a front end server.

In accordance with further aspects of the present invention, the partition housing the identified resource is located on multiple storage file servers, preferably two storage file servers, one functioning as a primary file storage server and the other functioning as a backup storage file server. Preferably, the backup storage file server is only available for access if the primary storage file server becomes unavailable, e.g., crashes. Thus, the backup storage file server is a redundant storage file server.

In accordance with another aspect of the present invention, multiple LPS servers are provided and the method includes determining which LPS server will provide the looked up storage server location. One way of determining which LPS server will provide the looked up storage server location includes processing the resource identifier using a hash function to provide a hashed resource identifier, which identifies the LPS server.

In accordance with still further aspects of the present invention, the LPS server uses the resource identifier to look up, in a resource lookup store, the storage server location, i.e., the location that identifies the particular partition in the particular storage file server, where the resource associated with the resource identifier is located. The LPS server grants the client device access to the storage resource by providing the storage server location to a front end server accessible by the client device.

In accordance with yet another aspect of the present invention, if the LPS server determines that no storage resource partition exists when receiving a resource identifier from a front end server, the LPS server automatically requests the creation of a storage resource at a particular storage server partition in a particular storage file server and associates the resource identifier with the newly created storage partition location in the resource lookup store. This newly created storage partition location is then be provided to the front end server.

In accordance with still further aspects of the present invention, creating a new storage resource on a storage server includes calculating a load balancing factor for each storage file server in a multiple file server storage system. The load balancing factor is used to determine where a new storage resource should be located. The load balancing factor may be based on a mapping number, a count of mapping accesses, a manual waiting value, or other information.

As can be seen from the foregoing summary, embodiments of the present invention provide an improved method for accessing and managing an online storage system and a related computer-readable medium and system.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

The detailed description which follows is represented largely in terms of processes and symbolic representations of operations by conventional computing components, including processors, memory storage devices for the processors, connected display devices, and input devices, all of which are well known in the art. These processes and operations may utilize conventional computing components in a heterogeneous distributed computing environment, including remote storage servers, computer servers, and memory storage devices; such processes, devices, and operations also being known to those skilled in the art and others. Each of these conventional distributed computing components is accessible by the processors via a communications network.

Embodiments of the present invention relate to providing a flexible and efficient method for accessing and managing online storage resources across remotely located multiple file servers. As will be better understood from the following description, lookup partitioning service servers add efficiency and flexibility to an online storage system employing embodiments of the present invention.

Figure 1:
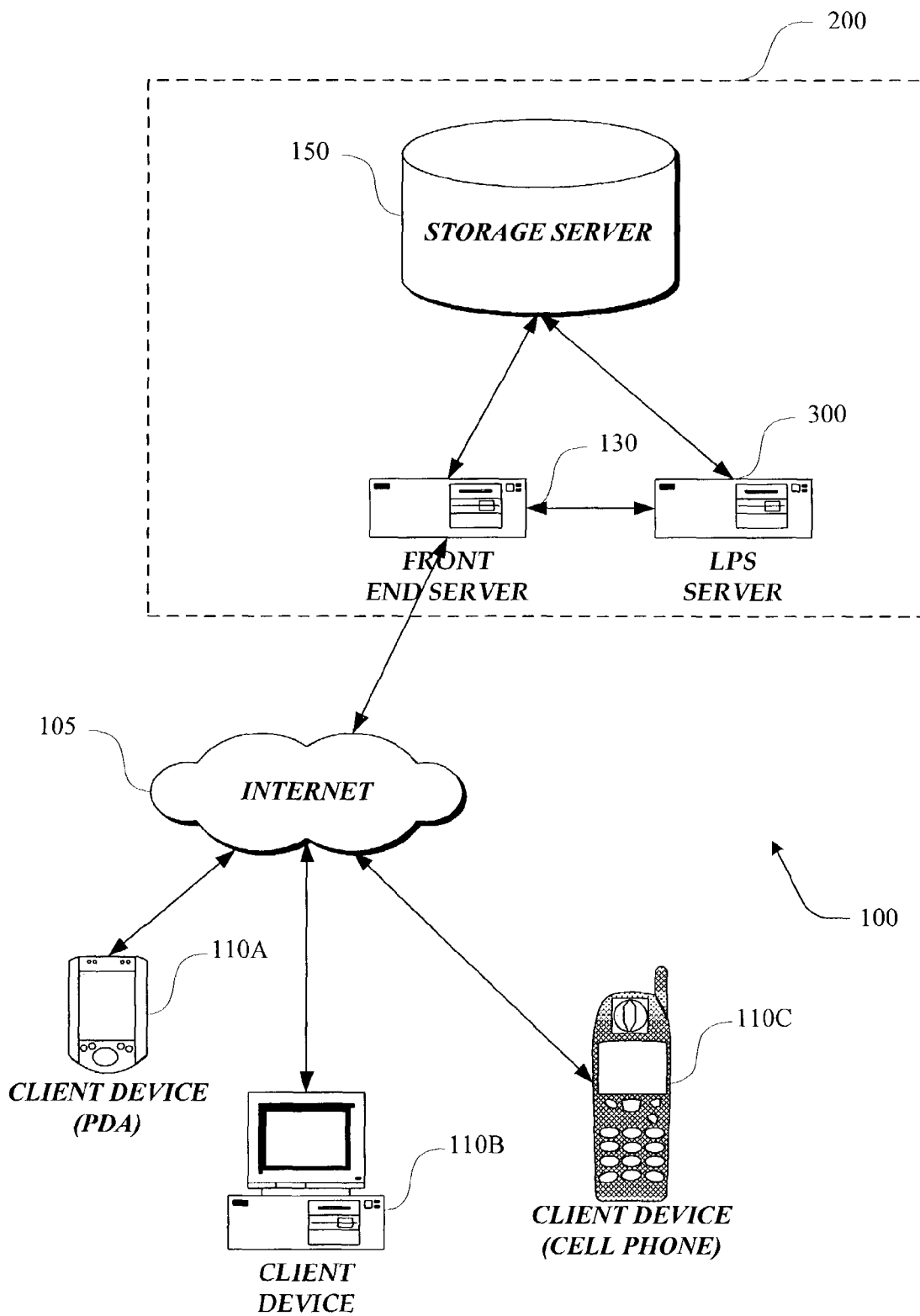
FIG. 1 is a pictorial diagram of an exemplary system for providing client device access to online resources.

As previously explained the capitalized term "Internet" refers to the collection of networks and monitors that communicate with one another. FIG. 1 is a pictorial diagram of an exemplary online storage system 100 for providing access to online storage resources to client devices 110A, 110B and 110C . . . , via the Internet 105. For ease of illustration, three representative client devices 110A, 110B and 110C are shown pictorially as a personal digital assistant (PDA) 110A, a personal computer 110B and a cellular telephone 110C in FIG. 1, it being recognized that a large number of client devices in a variety of forms would be included in an actual online storage system 100 employing an embodiment of the invention. In general, the client devices 110A, 110B, 110C have computing capabilities and may be any form of device capable of communicating with the server devices of embodiments of the present invention. Thus, while the client devices 110A, 110B and 110C are pictorially shown as a PDA, a personal computer and cellular telephone, this depiction should be taken as illustrative and not limiting.

The online storage system 100 functions in a distributed computing environment that includes the plurality of computing devices 110A, 110B, 110C . . . , interconnected by the Internet 105 (or some other suitable network) to a storage clearinghouse 200. The storage clearinghouse 200 includes a front end server 130, lookup partitioning service ("LPS") server 300, and storage server 150, all interconnected via a suitable network. As will be appreciated by those of ordinary skill in the art, the front end server 130, the LPS server 300, and the storage server 150, may reside on any device accessible by the client devices 110A, 110B, and 110C, shown in FIG. 1. An exemplary LPS server 300 is shown in detail in FIG. 3 and described below.

Figure 2:
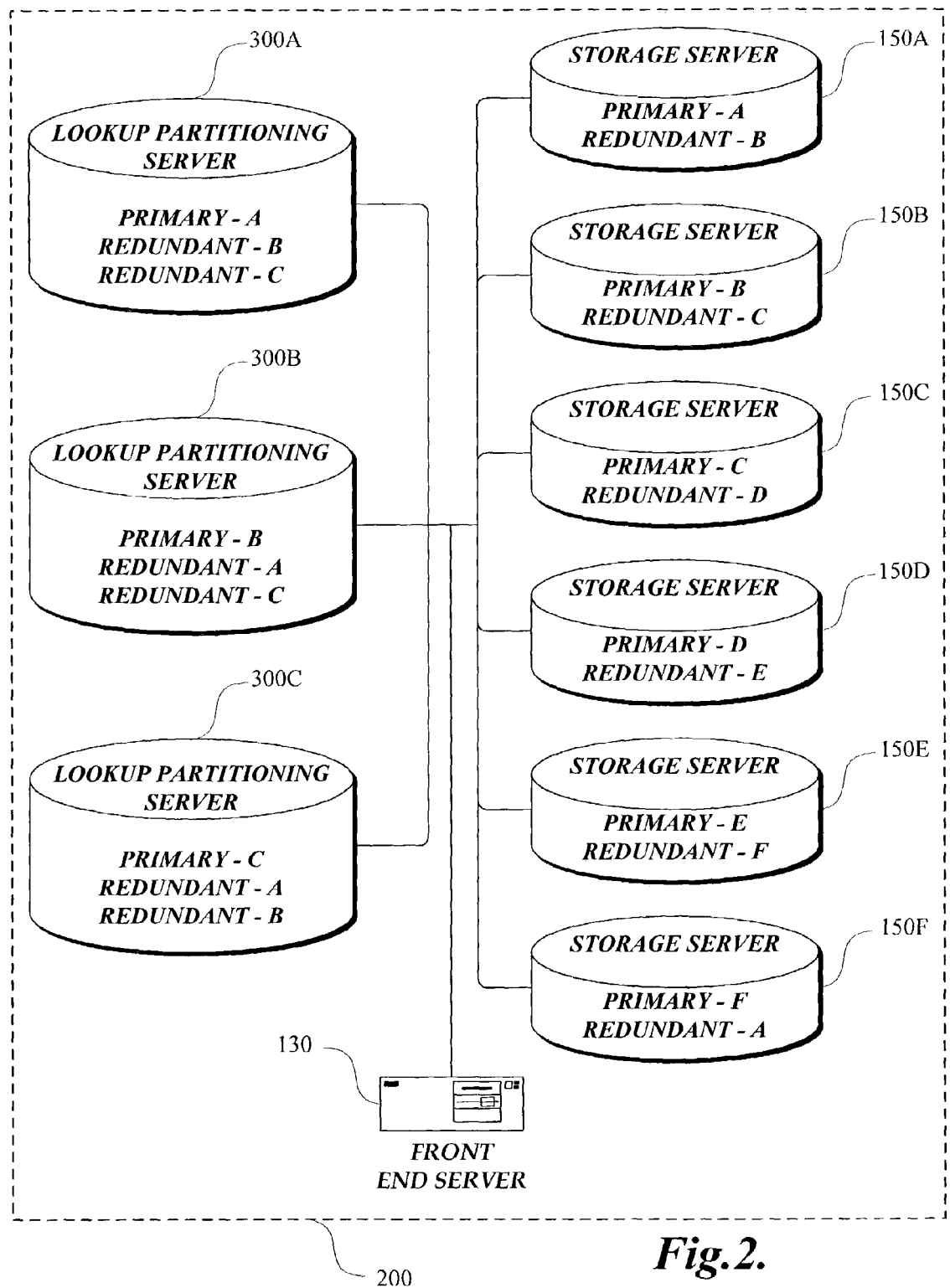
FIG. 2 is a pictorial diagram of a portion of an exemplary system for providing access to online resources that illustrates the redundant aspects of one exemplary embodiment of the invention suitable for use in FIG. 1.

It will also be appreciated that while the front end server 130, the LPS server 300 and the storage server 150 of the storage clearinghouse 200 are illustrated and described as separate devices, they may be formed by more or fewer devices. For example the LPS server 300 and the storage server 150 may be "virtual" servers residing on the same device. Likewise, the storage server 150 may be formed by several "virtual" servers residing on a single device, For example, a storage server that houses a redundant copy of a partition of another storage server as a redundant partition could be on the same device as the "other" storage server. Additionally, while only a single front end server 130, LPS server 300, and storage server 150 have been shown in FIG. 1, it will be appreciated that several front end servers 130, LPS servers 300, and storage servers 150 can be included in an actual system practicing embodiments of the present invention. One such embodiment that comprises several multiple LPS servers and several storage servers is illustrated in FIG. 2 and described below. It will also be appreciated that the LPS servers and the storage servers may be file server, database servers or a mixture of file servers and database servers.

An exemplary embodiment of the storage clearinghouse 200 is illustrated in more detail in FIG. 2. The exemplary storage clearinghouse 200 illustrated in FIG. 2, includes three LPS servers 300A-C, six storage servers 150A-F and a single front end server 130. The three LPS servers and the six storage servers are in communication with the front end server 130. Further as shown in FIG. 1, the three LPS servers and the six storage servers are in communication with one another.

Each of the LPS servers 300A-C includes a primary lookup partition, the two redundant look-up partitions, one for each of the other LPS servers. Storing (mirroring) information in two redundant partitions lookup provides for access to the storage servers even if the LPS servers continuing the primary and one of the redundant partitions are unavailable. Similarly, each of the storage servers includes a primary storage resource partition and a redundant storage resource partition. Providing redundant storage partitions on the storage servers 150A-F, provides for access to storage resources even if a storage resource's primary partition is not available due, for example, to storage server being offline. Communication between the LPS servers 300 and the storage servers 150 is illustrated in FIGS. 4 and 5 and described below.

Figure 3:
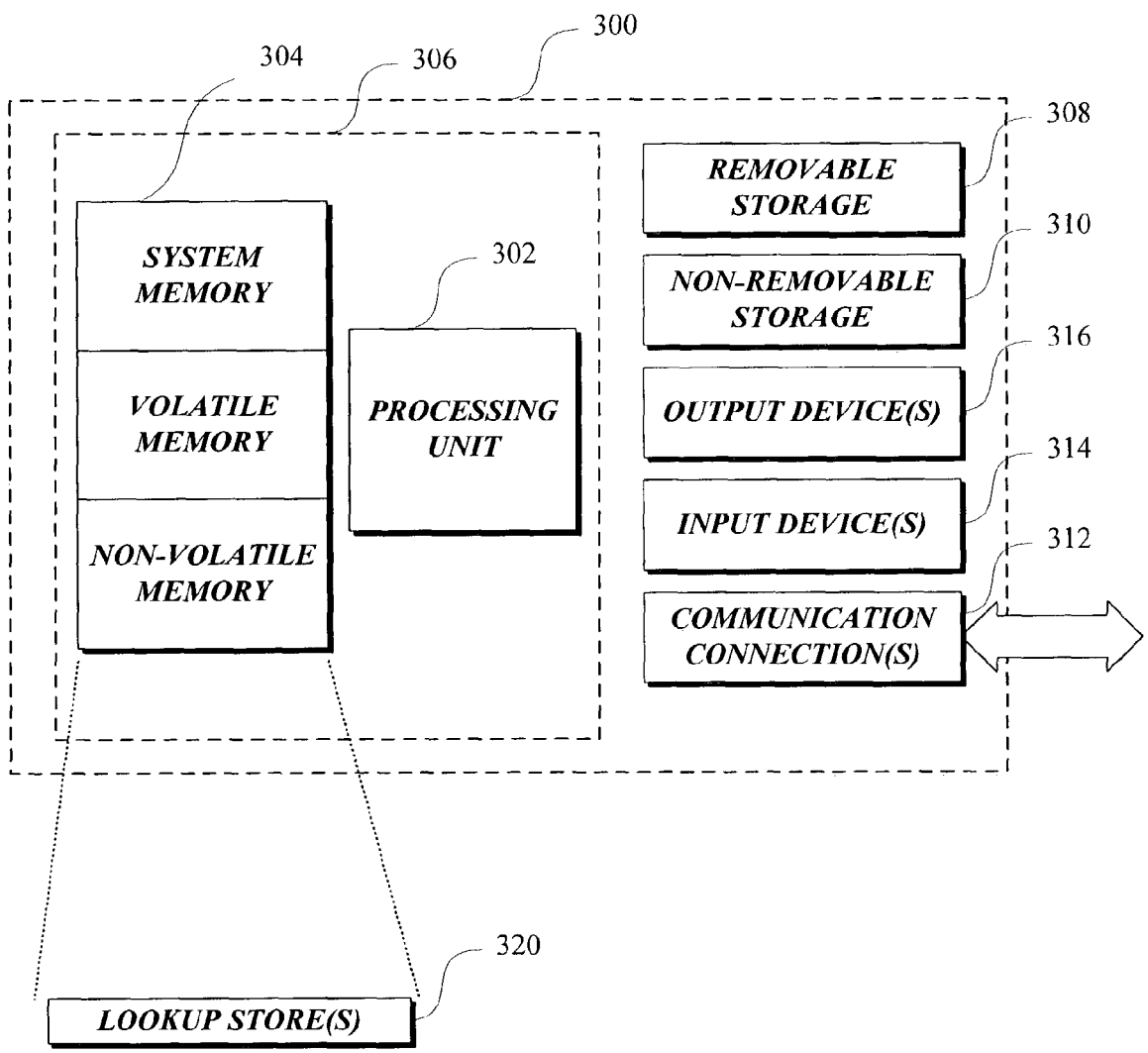
FIG. 3 is a block diagram of a lookup partitioning service server, suitable for use in FIGS. 1 and 2.

FIG. 3 illustrates an exemplary LPS server 300 suitable for use in the storage clearinghouse 200 shown in FIGS. 1 and 2. In its most basic form, the LPS server 300 typically includes at least one processing unit 302 and memory 304. Depending on the exact configuration and type of LPS server 300, memory 304 may be volatile (such as RAM), nonvolatile (such as ROM, flash memory, etc.), or some combination of the two. The most basic configuration of an LPS server is illustrated in FIG. 3 surrounded by dashed line 306. The LPS server 300 may also have additional features and/or functionality. For example, the LPS server 300 may also include additional storage (removable and/or nonremovable) including, but not limited to, magnetic or optical discs or tape. Such additional storage is illustrated in FIG. 3 by removable storage 308 and nonremovable storage 310. In general, computer storage media includes volatile and nonvolatile, removable and nonremovable media implemented in any method or technology for storage of computing information (e.g., computer readable instructions, data structures, program modules, other data, etc.). Memory 304, removable storage 308, and nonremovable storage 310, are all examples of computer storage media. Computer storage media includes, but is not limited to, RAM, ROM, EEPROM, flash memory, or other memory technology, CD, DVD, or other optical storage, magnetic cassettes, magnetic tape, magnetic disc storage, or other magnetic storage devices, or any other medium which can be used to store or read desired information and which can be accessed by the LPS server 300. Such computer storage media may be part of the LPS server 300. The memory 304 of a LPS server 300 practicing embodiments of the present invention stores a lookup store 320 that, includes associations (mappings) between resource identifiers ("RIDs") and partitions (both primary and redundant storage partitions, if applicable) on the storage servers 150 where storage resources are stored.

The LPS server 300 also contains a communications connection 312 that the LPS server uses to communicate with other devices. The communications connection 312 is used to communicate computer readable instructions, data structures, program modules or other data preferably using a modulated data signal that includes a carrier wave or other transport mechanism modulated by the data to be communicated. By way of example and not limitation, communication connection 312 includes wired connections, both copper and optical, and wireless connections such as acoustic, radio frequency, infrared, etc. LPS server 300 may also have input device(s) 314, such as a keyboard, a mouse, a pen, a voice input device, a touch input device, etc. Output device(s) 316, such as a display, speakers, a printer, etc., may also be included. Since all these devices are well known in the art, they are not described here. Since, in general, the front end server 130 and storage server 150 can be similar to the LPS server 300 described above, except for the lookup stores 320, these servers are not described in detail here.

Figure 4:
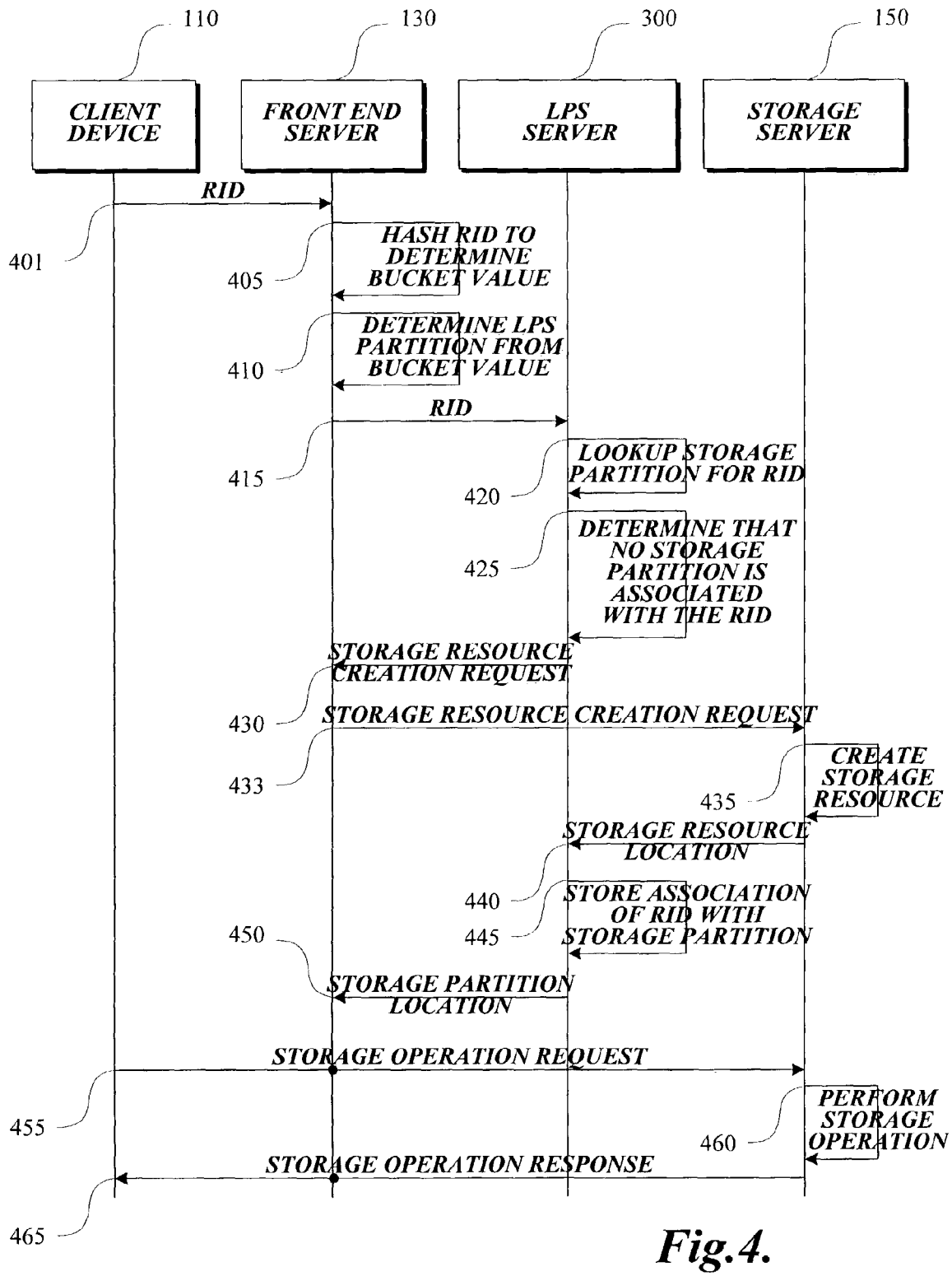
FIG. 4 is a diagram illustrating the actions of a client device, front end server, and a storage clearinghouse server when accessing online storage for the exemplary system shown in FIG. 1.
Figure 5:
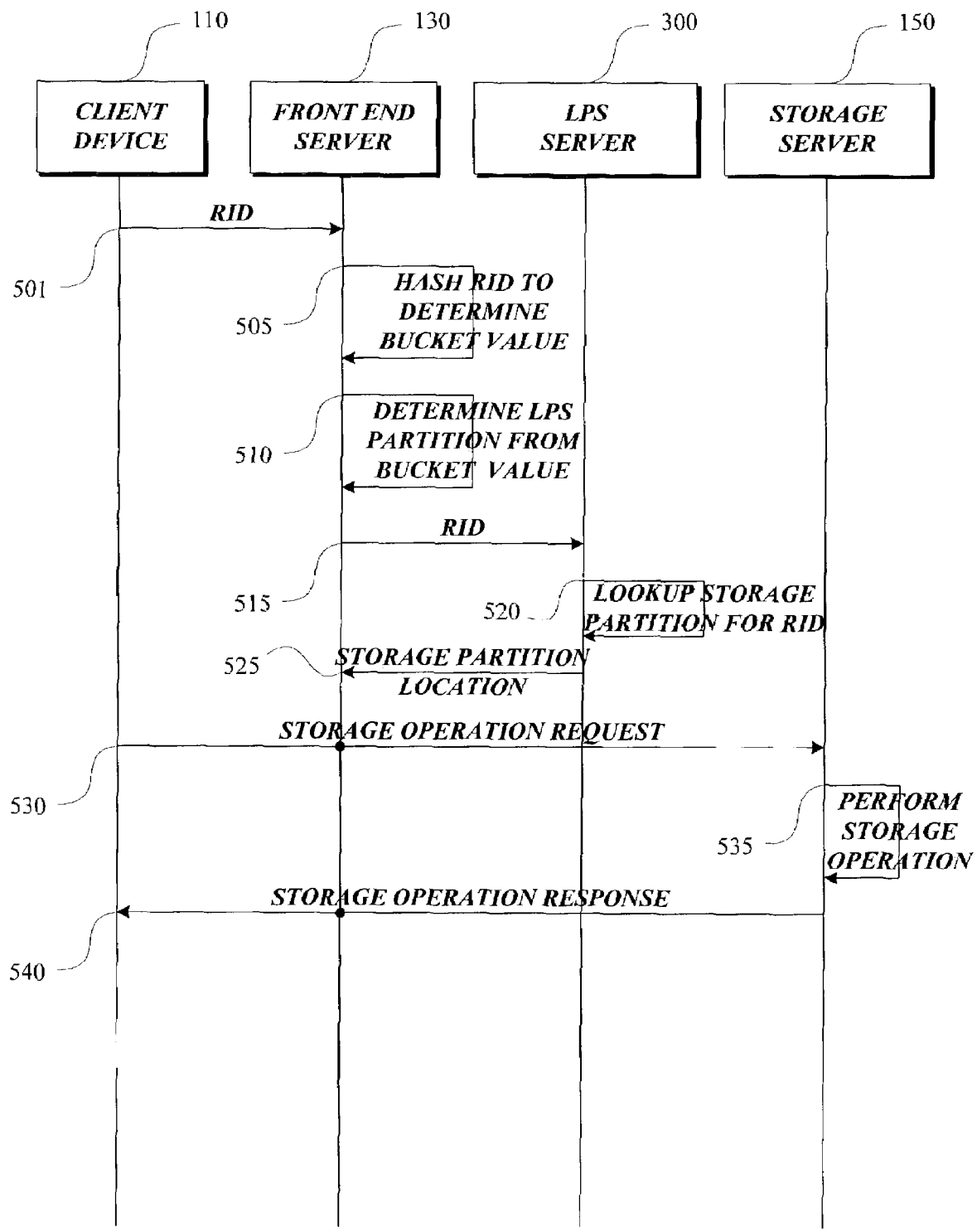
FIG. 5 is a diagram illustrating the actions of a client device, front end server, lookup partitioning service server, and storage clearinghouse server when granting access to online storage for the exemplary system shown in FIG. 1.

The operation of the online storage system 100 shown in FIGS. 1 and 2 will be best understood by reference to FIG. 4, which illustrates one exemplary sequence of communication interactions between a client device 110 and the servers shown in FIG. 1, i.e. the front end server 130, the LPS server 300, and the storage server 150. The exemplary communication interactions shown in FIG. 4 begin by the client device 110 sending 401 a resource identifier, i.e., an RID, to the front end server 130. The front end server 130 hashes 405 the RID to determine a "bucket value." Those of ordinary skill in the art and others will appreciate that hashing is the conversion of an identifier or key into a hash value, also called a bucket value, that identifies the location of the corresponding data in a data source (e.g., table, database, etc.). Hashing is typically accomplished by passing an identifier through a "hash function" to generate bucket or other hashed values. In embodiments of the present invention the hashing of the RID distributes the RID into bucket values that are essentially randomly distributed across the range of bucket values generated by the hash function. Next, the front end server 130 determines 410 the LPS partition associated with the bucket value (e.g., such as in a hash table on the front end server 130). As shown in FIG. 2 and described above, in one embodiment of the present invention, each LPS server includes a primary LPS partition and one or more redundant LPS partitions. Each primary and redundant LPS partition is associated with a particular bucket value. For example, the front end server 130 has a an entry for both the primary and any redundant LPS servers indexed by bucket values. That way if a primary LPS partition is unavailable, then the front end server 130 know where to locate the redundant LPS partition. Determining 410 the primary and redundant LPS partitions from the bucket values allows the front end server 130 to communicate with the LPS servers 300 that house the LPS partition associated with the RID. Those of ordinary skill in the art and others will appreciate that if the LPS server 300 containing the primary LPS partition associated with the RID is available, the front end server 130 will communicate with that LPS server 300. If, however, the LPS server 300 containing the primary LPS partition is not available, the front end server 130 will communicate with one of the LPS servers 300 that contains a redundant LPS partition associated with the RID (based on some predetermined algorithm if more than one redundant LPS partition is available).

After an LPS partition is determined by the front end server 130 in the manner described above, the front end server 130 communicates 415 the RID to the LPS server 300 housing the (primary or redundant) LPS partition. The LPS server 300 then looks up 420 the storage partition for the RID in its lookup store 320.

If the LPS server 300 determines 425 that no storage partition is associated with the RID, a new storage resource is created 435. The new storage resource is created in response to a storage resource creating request 430 generated by the LPS server 300 that is forwarded via the front end server 130 as a storage resource creating request 433 for the storage server 150. The new storage resource creation is based on load balance data collected by the LPS server 300.

The storage server 150 containing the storage partition associated with the newly created storage resource returns 440 partition location information to the LPS server 300. The LPS server 300 stores 445 the association between the RID and the new storage partition. The creation of storage resources based on load balance data is discussed in greater detail below with regard to a storage resource creation subroutine 900 illustrated in FIG. 9 and a storage partition determining routine 1000 illustrated in FIG. 10.

The LPS server 300 next returns 450 the storage partition location to the front end server 130. The client device 110 may then request 455 a storage operation from the storage server 150, via the front end server 130 since the front end server 130 now knows the location of the partition housing the storage resource. The storage server 150 performs 460 the storage operation at the storage partition location indicated by the front end server 130, after which the storage server 150 returns a storage operation response 465 to the client device 110 via the front end server 130.

The operation of online storage system 100 shown in FIGS. 1 and 2 will be further understood by reference to FIG. 5, which illustrates another exemplary sequence of communication interactions between a client device 110 and the servers shown in FIG. 1. While similar to FIG. 4, FIG. 5 does not include the creation of a new resource prior to performing a storage operation. Like FIG. 4, in addition to a client device 110, FIG. 5 includes a front end server 130, an LPS server 300 and a storage server 150.

The exemplary communications interactions shown in FIG. 5 begin with the client device 110 sending 501 an RID to the front end server 130. Next, the front end server 130 hashes the RID to determine a "bucket value." Then, the front end server 130 determines 510 the LPS partitions associated with the bucket value. Each LPS server 300 in this exemplary embodiment of the present invention includes a primary LPS partition and one or more redundant LPS partition. As with FIG. 4, determining 510 the LPS partition from the bucket value allows the front end server 130 to communicate with the LPS server that houses the LPS partition associated with the RID.

After an LPS partition is determined 510 at the front end server 130, the front end server 130 communicates 515 the RID to the LPS server 300 housing that LPS partition. The LPS server 300 then looks up 520 the storage partition associated with the RID. In the exemplary embodiment illustrated in FIG. 5, the LPS server 300 returns 525 the location of the storage partition associated with the RID to the front end server 130. The client device 110 may then request 530 a storage operation from the storage server 150 via the front end server 130. The storage server 150 performs 535 the storage operation at the storage partition location indicated by the front end server 130, after which the storage server 150 returns the storage operation response 540 to the client device 110 via the front end server 130.

Those of ordinary skill in the art and others will appreciate that the communication interactions illustrated in FIGS. 4 and 5 provide structured and efficient access to storage resources without having to maintain rigid mappings between an RID and a storage location. Each RID to partition association stored on the LPS servers can be updated or modified without disturbing of any other RIDs to partition association. As illustrated in FIG. 4, the system 100 is able to automatically create new storage resources, when they are needed. Those of ordinary skill in the art and others will appreciate that FIGS. 4 and 5 represent only exemplary sets of communication interactions between the devices of the online storage system 100 and that various changes can be made therein without departing from the spirit and scope of the invention. For example, the hashing of RIDs to form bucket values may not always be necessary, particularly if RIDs are associated with specific LPS partitions and/or servers (e.g., if there were only a single LPS partition and/or LPS server 300 associated with an RID).

The communication interactions illustrated in FIGS. 4 and 5 between various devices of the online storage system 100 may employ any conventional communications form. In one exemplary embodiment of the present, invention communications are formatted using Simple Open Access Protocol ("SOAP") with Extensible Markup Language ("XML") formatted instructions and/or parameters. An exemplary XML formatted instruction for a resource creation request (RAdd) is illustrated by the following code in Table 1:

TABLE 1

POST/rservice/rservice.asmx HTTP/1.1
Host: contacts.msn.com
Content-Type:text/xml; charset=utf-8
Content-Length: length
SOAPAction: "http://www.msn.com/webservices/Resource/RAdd"
<?xml version="1.0" encoding="utf-8"?>
<soap :Envelope xmlns :xsi="http://www.w3.org/2001/XMLSchema-instance"
xmlns:xsd="http://www.w3.org/2001/XMLSchema"
xmlns: soap="http://schemas.xmlsoap.org/soap/envelope/">
  <soap:Header>
    <RApplicationHeader xmlns=
    "http://www.msn.com/webservices/Resource">
      <ApplicationId>00000000000000000000010010efd4e487
      </ApplicationId>
      <IsMigration>0</IsMigration>
    </RApplicationHeader>
    <RAuthHeader xmlns=
    "http://www.msn.com/webservices/Resource">
      <ManagedGroupRequest>0
      </ManagedGroupRequest>
    <RAuthHeader>
  </soap:Header>
  <soap:Body>
    <RAdd xmlns="http://www.msn.com/webservices/Resource">
      <rInfo>
        <name></name>
        <ownerPuid>7893478923</ownerPuid>
        <ownerEmail>ken@hotmail.com</ownerEmail>
      </rInfo>
    </RAdd>
  </soap:Body>
</soap:Envelope>

Those of ordinary skill in the art and others will appreciate that the resource creation request illustrated above is merely one exemplary form of communication interaction between the devices of the online storage system 100 illustrated in FIGS. 4 and 5 and that many other forms of communication interactions are possible.

Figure 6:
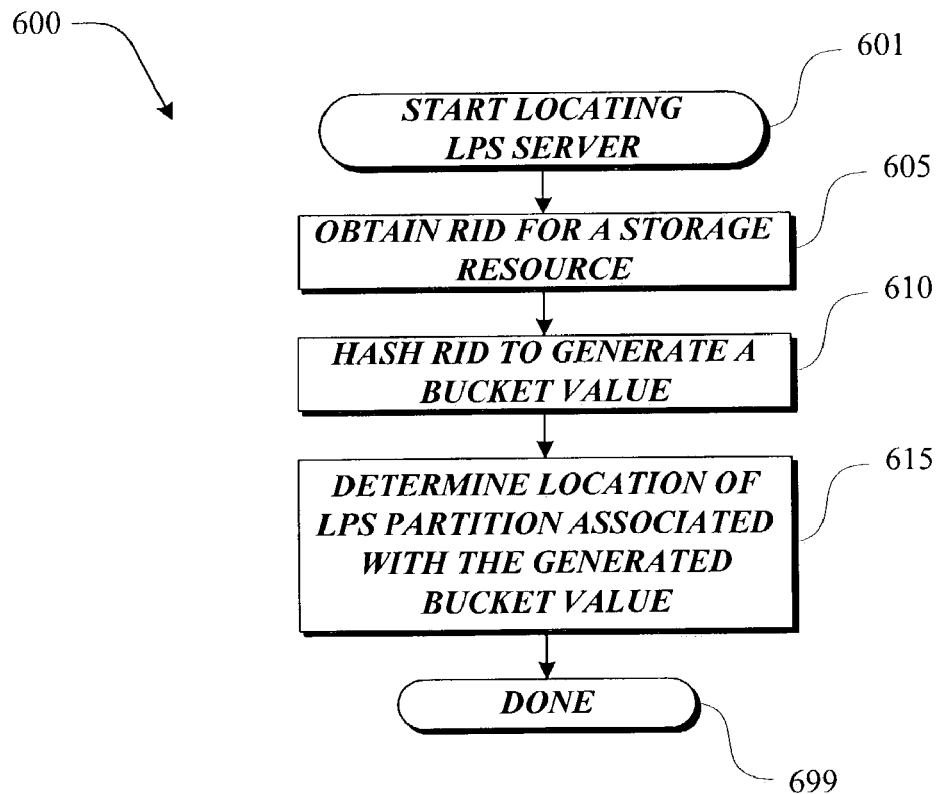
FIG. 6 is a flow diagram illustrating an exemplary lookup partitioning service server locating routine according to embodiments of the present invention.

The storage clearinghouse 200 of the online storage system 100 described herein includes a front end server 130 that is used to manage communications between client devices 110A, 110B, 110C . . . , and one or more of the LPS servers 300 and one or more storage servers 150. FIG. 6 is a flow diagram illustrating an exemplary LPS server locating routine 600 suitable for implementation by the front end server 130 for locating an LPS server 300 able to conduct storage partition lookups based on an RID. The LPS server locating routine 600 begins at block 601 and proceeds to block 605 where an RID associated with a storage resource is obtained, i.e., received from a front end server 130. The front end server 130 hashes the RID to generate a bucket value as shown by block 610. As described above, hashing a value, such as an RID, is accomplished by processing the value using a hash function. Next, in block 615 the front end server 130 determines the location of the LPS partition associated with the bucket value generated by the hash function. Routine 600 then ends at block 699.

Those of ordinary skill in the art and others will appreciate that in a storage clearinghouse 200 with LPS servers 300 that have redundant LPS partitions, determining the location of the LPS partition associated with the bucket value generated by the hash function (as in block 615) includes determining if a primary LPS is available. If a primary LPS partition is unavailable, then a further determination of the location of a redundant LPS partition associated with the bucket value generated by the hash function is needed.

As described above with regard to FIGS. 4 and 5, after the front end server 130 has determined which LPS partition is associated with a particular bucket value (and accordingly a particular RID), the front end server 130 can communicate with the LPS server 300 that houses the associated LPS partition. The LPS server 300 is responsible for looking up which storage partition (and therefore which storage server 150) houses the storage resource identified by an RID.

Figure 7:
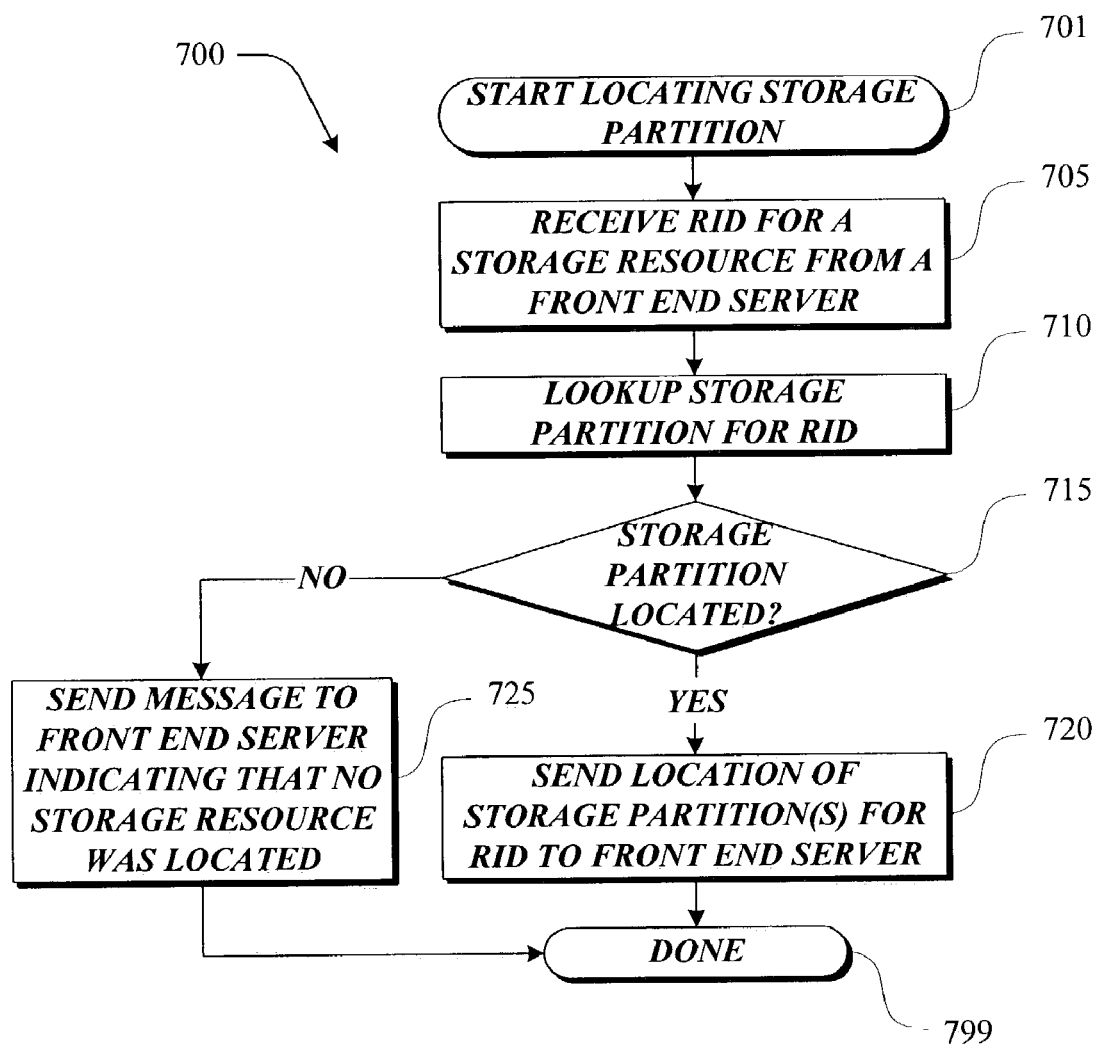
FIG. 7 is a flow diagram illustrating an exemplary storage partition locating routine according to embodiments of the present invention.

FIG. 7 illustrates an exemplary storage partition locating routine 700 suitable for implementation by an LPS server 300 for determining the location of a storage partition associated with an RID. The storage partition locating routine 700 begins at block 701 and proceeds to block 705 where an RID for a storage resource is received from a front end server 130. Next, in block 710 the LPS server 300 looks up the storage partition for the RID in its lookup store 320 (FIG. 3). Those of ordinary skill in the art and others will appreciate that the RID received by the LPS server 300 may have the same format as the RID sent to the front end server 130 or may be a transformation of the RID, e.g., a hashed value, or other transformation of the RID received from the front end server 130. Such transformations may be desirable if the RID received at the front end server 130 is not appropriate for performing an efficient lookup of the location of a storage partition in a lookup store 320. For example, if the RID is an arbitrary textual name assigned by a user, a hashed value of the arbitrarily assigned name would provide a more efficient "key" for looking up a storage partition in a conventional lookup store 320. However, Alternatively, as those of ordinary skill in the art and others will appreciate, the RID may in fact be identical or closely related (e.g., a zero extended value to bring the RID up to a uniform number of digits) to the RID received by the front end server 130.

Next, processing continues in decision block 715 where a determination is made whether the storage partition was located in the lookup store 320. If so, processing proceeds to block 720 where the location of the storage partition associated with the RID is sent to the front end server 130. Those of ordinary skill in the art and others will appreciate that in a storage clearinghouse 200 with storage servers 150 that have redundant storage partitions, location and sending a location of the storage partition associated with the RID, as in blocks 710 and 720, also includes locating and sending any locations of redundant storage partitions associated with the RID. Then, the storage partition locating routine 700 ends at block 799. If, however, in decision block 715 a determination was made that the storage partition was not located in block 710, processing proceeds to block 725 where a message is sent to the front end server 130 indicating that no storage resource was located. The storage partition locating routine 700 then ends at block 799.

If a storage partition on a storage server 150 was identified to the front end server 130 as housing a storage partition associated with an RID, the front end server 130 may then communicate storage operations to the storage server 150 to be performed on the storage resource associated with the RID at the storage partition. The storage server 150 processes storage operation requests from the front end server.

Figure 8:
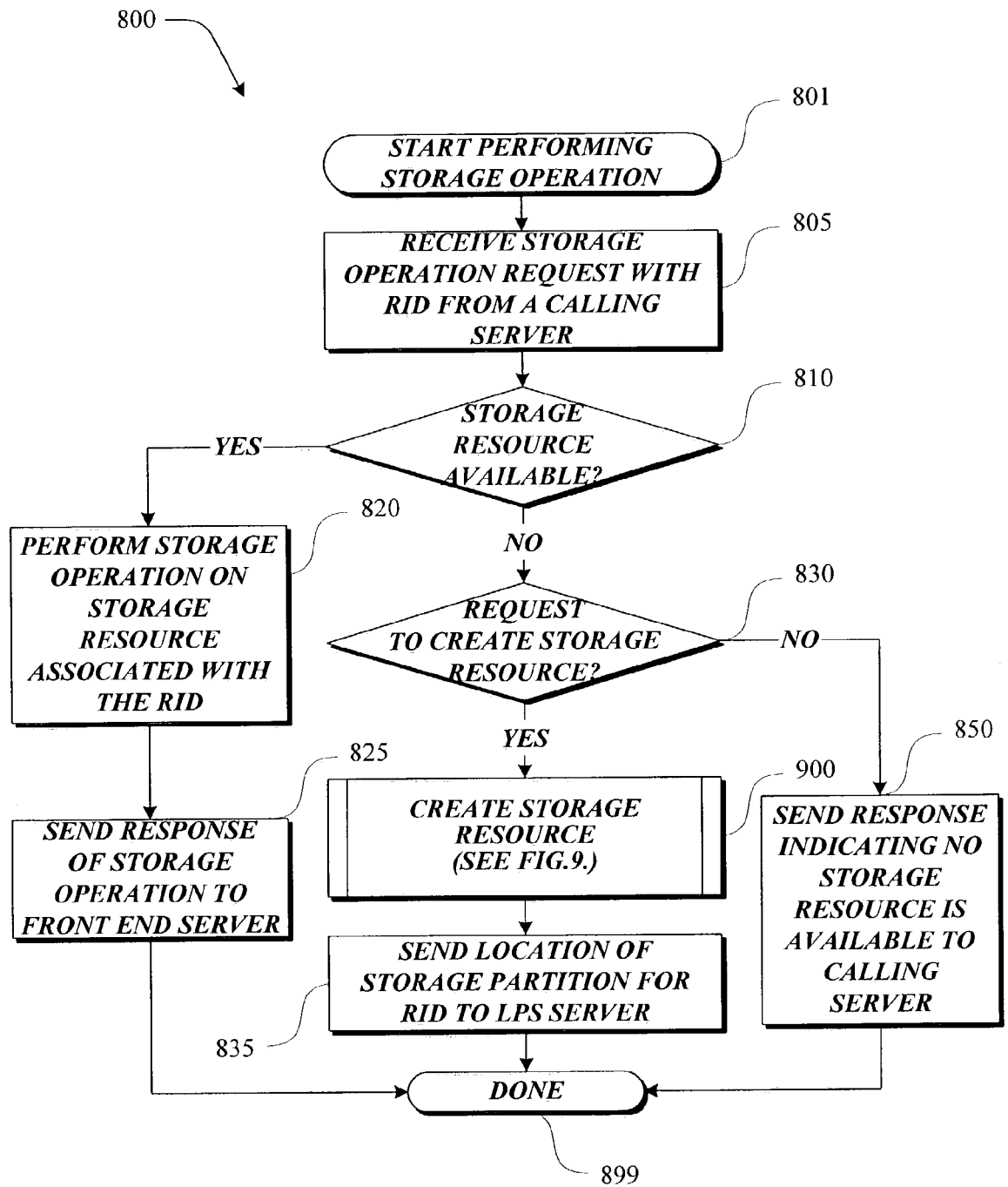
FIG. 8 is an overview flow diagram illustrating an exemplary storage operation performing routine according to embodiments of the present invention.

FIG. 8 illustrates an exemplary storage operation performing routine 800 on a storage server 150. The storage operation performing routine 800 is an alternative to the communication interactions shown in FIG. 4 wherein the LPS server determines if a storage resource is available. In FIG. 8, this determination is made by a storage server. Routine 800 begins at block 801 and proceeds to block 805 where a storage operation request is received along with a RID from a calling server. The storage operation request may be received from either an LPS server 300 (in the case of a resource creation request) or from the front end server 130 (for other storage operation requests). In decision block 810, a determination is made by the storage server whether a storage resource associated with the RID is available by checking the partitions of the storage server 150. If a storage resource associated with the RID is available, processing continues to block 820 where the storage operation is performed on the storage resource associated with the RID. Those of ordinary skill in the art and others will appreciate that the storage operation can be any one of a number of different storage operations performed on storage resources including but in no way limited to read requests, write requests, create requests, update requests, delete requests, copy requests, insertion requests, backup requests, restore requests, and the like.

Those of ordinary skill in the art and others will appreciate that in a storage clearinghouse 200 with storage servers 150 that have redundant storage partitions, determining if a partition associated with an RID is available, as in decision block 810, includes determining if a primary storage partition is available. Next, if a primary storage partition is unavailable, then a further determination is made whether any redundant storage partitions associated with the RID are available, and only if none are available is a determination made that the storage partition is not available.

In one exemplary embodiment, the storage resource is a hierarchical in nature. Storage operation requests can be directed to specific levels in the storage hierarchy. One example of a hierarchical storage resource is a university storage resources comprising department records, course records, professor records, students enrolled in course records and student records. Storage operations might apply to any record level in this example. For example, a new department record might be created. This creation would, in turn, require course records, professor records, and students enrolled in course records to be created and added to the department records in a hierarchical fashion. The above example is merely meant to be illustrative of one form of storage resource. Those of ordinary skill in the art and others will appreciate that many other forms of storage resources, including, but not limited to, flat files, databases, and link lists may form storage resources suitable for storage in partitions on the storage server 150.

After a storage operation is performed on the storage resource in block 820, the response (if any) to the storage operation is sent back, in block 825, to the front end server 130. Then, the storage operation performing routine 800 ends at block 899.

If in decision block 810 it is determined that a storage resource associated with the RID is not available, processing proceeds to decision block 830 where a determination is made whether the storage operation request is a request to create a new storage resource. If so, processing proceeds to subroutine block 900 where a new resource is created. An exemplary new storage resource creation subroutine 900 is illustrated in FIG. 9 and described below.

After the new storage resource creation subroutine 900 returns, processing proceeds to block 835 where the location of the new storage resource associated with the RID is sent to the LPS server 300 (where it is saved in a lookup store 320 that associates storage resource locations with the RIDs). Processing then ends at block 899. If, however, in decision block 830 it was determined that the request was not a request to create a storage resource, processing proceeds to block 850 where a response indicating that no storage resource is available is sent to the calling server (either the front end server 130 or an LPS server 300). Then processing ends at block 899.

Figure 9:
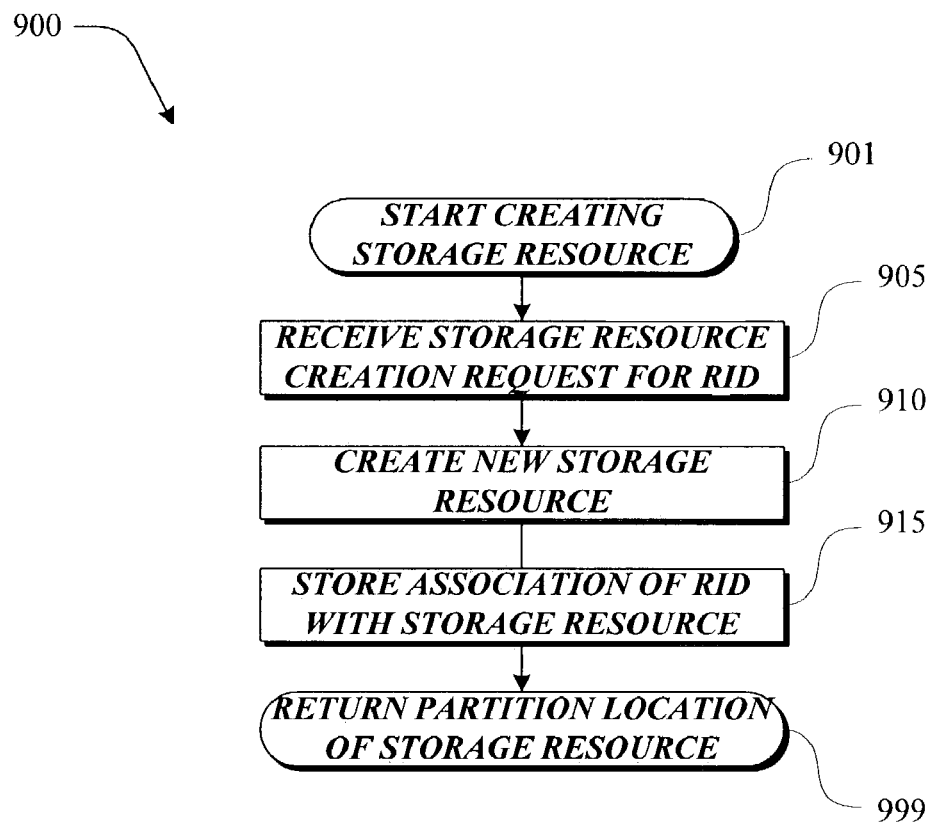
FIG. 9 is a flow diagram illustrating a storage resource creation subroutine suitable for use in FIG. 8.

FIG. 9 illustrates an exemplary storage resource creation subroutine 900 suitable for use in FIG. 8. The exemplary storage resource creation subroutine 900 begins at block 901 and proceeds to block 905 where a storage resource creation request for an RID is received. Next, in block 910 a new storage resource is created in a storage server 150. In block 915, the association of the new storage resource to the RID is stored in either an LPS server or a storage server depending on how the invention is implemented. The storage of the association is used to identify the partition where the new resource is stored when subsequent storage operation requests are received. Then, the storage resource creation subroutine 900 ends at block 999, returning the location of the new storage resource's storage partition.

Figure 10:
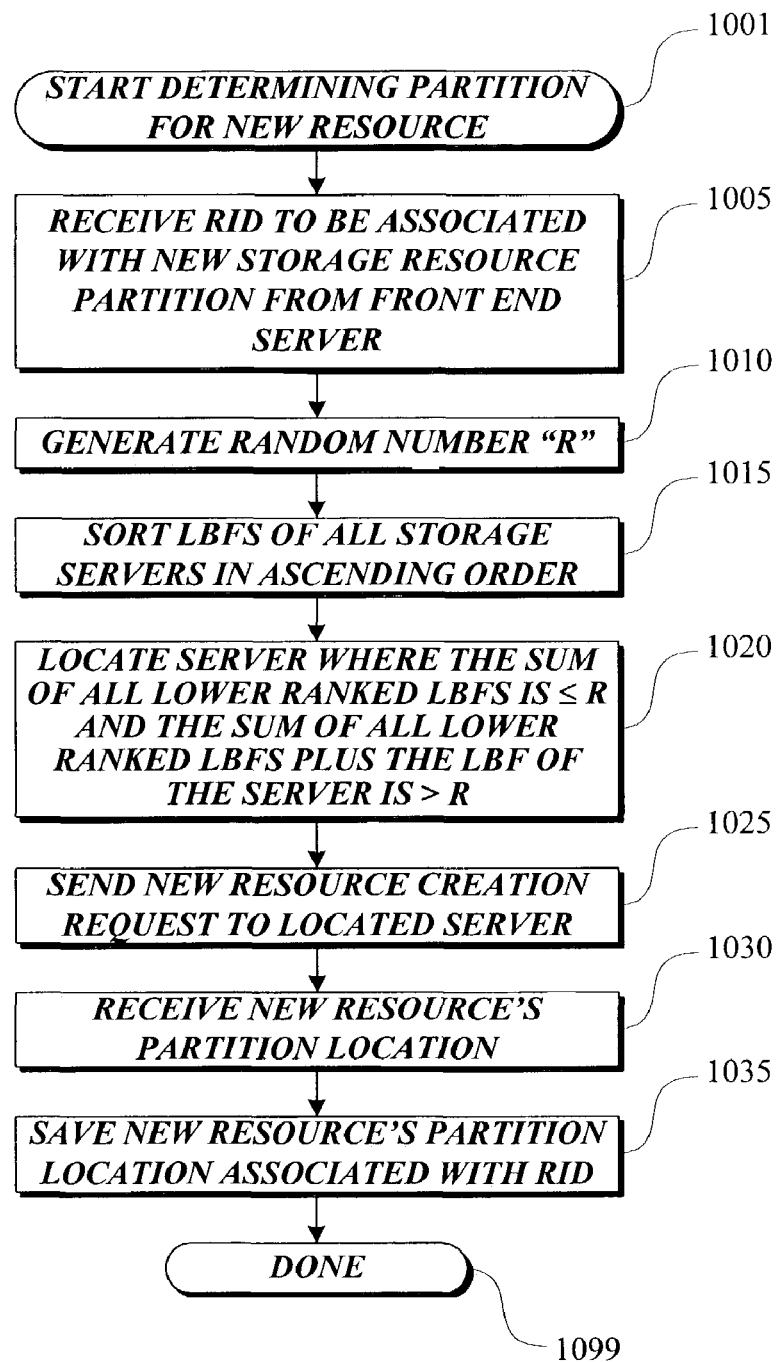
FIG. 10 is a flow diagram illustrating an exemplary storage partition determining routine for a new storage resource according to embodiments of the present invention.

In one exemplary embodiment of the present invention, creating a new storage resource also involves choosing the location of the new partition, i.e., which storage server is to provide the partition that stores the new storage resource. FIG. 10 illustrates an exemplary new partition storage partition selection routine 1000. The new storage partition selection routine 100Q begins in block 1001 and proceeds to block 1005 where an RID to be associated with a new storage resource is received from a front end server 130. In one exemplary embodiment, the RID is obtained from an explicit storage resource creation request. Alternatively, an LPS server 300 may automatically initiate the creation of a new storage resource when an RID that is not associated with any storage partition is received.

Next, in block 1010 a random number "R" is generated. In one exemplary embodiment of the present invention the random number R is any real number between zero and one. In block 1015 the storage partitions on the storage servers 150 are ranked in ascending order according to a load balancing factor ("LBF") for each storage partition. LBFs are determined (or arbitrarily set to increase or decrease a storage partition's usage) values that represent a current load on a storage partition. LBF values may be determined using a number of different factors, including, but not limited to mapping numbers (number of storage resources on a storage partition), mapping accesses (number of accesses to storage resources on a partition), assigned manual weighting values (e.g., arbitrarily set weighting values or weighting values set according to an LBF value desired for a particular storage partition) or some combination thereof.

One exemplary embodiment of present invention calculates LBF values for storage partitions as follows: given "n" partitions (P1, P2, . . . Pn) and the mapping counts for the partitions are C1, C2, . . . Cn, then the LBF for any storage partition "m" can be calculated as $LBF_m=(1/C_m)/(1/C_1+1/C_2+ \ldots +1/C_n)$. For example, given three partitions with proportionate mapping counts of C1=20%, C2=30% and C3=50%, then $LBF_1=(1/20)/(1/20+1/30+1/50)\approx 48\%$, $LBF_2=(1/30)/(1/20+1/30+1/50)\approx 32\%$ and $LBF_3=(1/50)/(1/20+1/30+1/50)\approx 20\%$. Of course this is merely one possible method of calculating LBF values, and those of ordinary skill in the art will appreciate that other methods of calculating LBF values are possible.

In block 1020, a storage partition is located where the sum of all lower ranked LBFs is less than or equal to and the sum of all lower ranked LBFs plus the LBF of the located partition is greater than R. Next, in block 1025, a new resource creation request is sent to the located storage partition. The located storage server containing the storage partition processes the new resource creation request (see FIGS. 8-9). The location of the new storage resource's partition is received back at the LPS server 300. See block 1030. The new partition location is associated with the previously received RID and the association is saved (in block 1035) in the lookup store 320 of the LPS server 300. The storage partition selection routine 1000 then ends at block 1099.

As will be appreciated by those skilled in the art the new storage partition selection routine 1000 described has an inherent load balancing effect because storage partitions are chosen when new partitions are assigned storage resources based on the load balance factors (LBFs) of each storage partition. Those of ordinary skill in the art and others will also appreciate that the new storage partition selection routine 1000 described above should be taken as exemplary, not limiting. Many other new storage partition selection routines may be used without departing from the spirit and scope of the present invention. For example, the ordering of partitions LPFs may be reverse, with an equivalent reversal of the conditions the random number R must meet. Still other variations will be apparent to those of ordinary skill in the art.

In another exemplary embodiment of the present invention, the location of a storage resource may be moved from one partition to another partition (e.g., to a partition on a server with more available storage space, with a faster connection, with more reliable storage hardware, etc.). Moving a storage resource from one storage partition to another storage partition involved briefly locking the mapping of the RID to the storage resource's storage partition, but does not require locking any other storage resource's mapping (as a hash-based allocation would). When a storage resource is moved to a new partition, the LPS server 300 associated with the RID of the storage resource updates its lookup store 320 to map the RID of the storage resource to it new storage partition location.

In one exemplary embodiment of the present invention, the lookup store 320 comprises a lookup table containing resource and partition information as shown below in Table 2:

TABLE 2

| Name | Type | Length |
|---|---|---|
| tbl_Partition: | | |
| PartitionID | smallint | 2 |
| PartitionName | nvarchar | 64 |
| LoadBalanceFactor | float | 8 |
| ProvisionTo | bit | 1 |
| MappingCount | int | 4 |
| LastModifiedDate | datetime | 8 |
| tbl_PartitionMapping: | | |
| ApplicationID | smallint | 2 |
| RID | uniqueidentifier | 16 |
| PartitionID | smallint | 2 |
| Status | tinyint | 1 |
| Hashbucket | smallint | 2 |
| LastModifiedDate | datetime | 8 |

The lookup store 320 stores a list of partitions described by "tbl_Partition" entries that are mapped to "tbl_PartitionMapping" entries for storage resources that are associated with one of the partitions listing in the lookup store 320 (note the "PartitionID" field in the tbl_PartitionMapping entry). Those of ordinary skill in the art will also appreciate that a storage resource entry of a lookup store 320 using a tbl_PartitionMapping entry, as listed above, also includes an "ApplicationID" field that designates a type of application for use with a storage resource. It will also be appreciated that including an ApplicationID enables embodiments of the present invention to store multiple types of storage resource for multiple types of applications. Such a multiple application type/resource embodiment of the present invention is substantially similar to a single application type/resource type embodiment of the present invention, however, in addition to an RID used to designate a storage resource, an ApplicationID would also be used. Accordingly, in such an embodiment an RID could be associated with multiple storage resources if each storage resource had a separate ApplicationID. For example, a network-based digital photograph storing system might store digital images as well as images descriptions for each digital image. In such a system the digital images and the images descriptions would have the same RID, however each could have different ApplicationIDs and may even be stored in a separate partition. It will also be apparent to those skilled in the art that an embodiment combining the RID and ApplicationID is also possible, however, such an embodiment is that is substantially similar to the single application embodiment of the present invention. The above-described embodiment should be taken as illustrative and not limiting While the presently preferred embodiment of the invention has been illustrated and described, it will be appreciated that various changes can be made therein without departing from the spirit and scope of the invention as defined by the appended claims.

The embodiments of the invention in which an exclusive property or privilege is claimed are defined as follows:

1. A computer implemented method of managing access to a storage resource for one of a plurality of network-based applications in a multiple server storage system, the method comprising:

obtaining a resource identifier from a front end server;

utilizing the resource identifier to lookup, in a resource lookup store of a lookup partitioning service server, a partition of a storage server associated with the resource identifier;

in an event the partition of the storage server is associated with the resource identifier, granting access to the storage resource by providing a location of the partition of the storage server to the front end server; and in an event no partition of the storage server is associated with the resource identifier:

failing to locate a mapping to the storage resource;

determining a load balancing factor for each storage partition of a plurality of storage partitions;

using the load balancing factors to determine a new storage partition in which a new storage resource should be created and creating the new storage resource in the new storage partition;

mapping the resource identifier to the new storage partition in the resource lookup store; and providing a location of the new storage partition to the front end server, wherein determining a load balancing factor for each storage partition comprises:

given n storage partitions, determining the number of mapping counts C for each of the n storage partitions; and calculating a load balancing factor ($LBF_m$) for each storage partition m using the following:

$$LBF_m = (1/C_m)/(1/C_1 + 1/C_2 + \ldots + 1/C_n).$$

2. The method of claim 1, wherein the location of the partition of the storage server is on one of a plurality of storage servers.

3. The method of claim 1, wherein the plurality of storage partitions include a primary storage partition and a redundant storage partition each containing the storage resource.

4. The method of claim 3, wherein the primary storage partition and the redundant storage partition are each located on separate storage servers of a plurality of storage servers.

5. The method of claim 4, wherein, if the primary storage partition is unavailable, the storage server location is the redundant storage partition.

6. The method of claim 1, further comprising determining which lookup partitioning service server of a plurality of lookup partitioning service servers will provide wherein the looked-up storage server location in response to the resource identifier.

7. The method of claim 6, wherein determining which lookup partitioning service server will provide the looked-up storage server location comprises processing the resource identifier through a hash function to provide a hashed resource identifier associated with a particular lookup partitioning service server.

8. The method of claim 7, wherein each lookup partitioning service server is associated with a predetermined set of hashed resource identifiers.

9. The method of claim 1, further comprising moving the storage resource from one storage partition to another storage partition and updating the resource lookup store with the another storage partition.

10. The method of claim 1, wherein the load balancing factors are further based on a value selected from the values consisting of: a mapping number and a manual weighting value.

11. The method of claim 1 further comprising adjusting a manual weighting value to increase a usage of a storage server.

12. The method of claim 1, further comprising adjusting a manual weighting value to decrease a usage of a storage server.

13. The method of claim 1, wherein using the load balancing factors to determine a new storage partition comprises:
generating a random number R, where R is a real number between 0 and 1;
ranking the load balancing factors in ascending order;
locating a particular storage partition, where the sum of all the load balancing factors ranked lower than the load balancing factor corresponding to the particular storage partition is less than or equal to R, and the sum of all the load balancing factors ranked lower than the load balancing factor corresponding to the particular storage partition plus the load balancing factor corresponding to the particular storage partition is greater than R.

14. A computer readable storage medium containing computer-executable instructions for performing a method of managing access to a storage resource for one of a plurality of network-based applications in a multiple server storage system, the computer-executable instructions comprising:
receiving a resource identifier associated with the storage resource from a front end server;
utilizing the resource identifier to lookup, in a resource lookup store of a lookup partitioning service server, a storage partition associated with the resource identifier;
in an event the storage partition is associated with the resource identifier:
locating the storage partition of a storage server; and
sending the location of the storage partition to the front end server to grant access to the storage resource; and
in an event the storage partition is not associated with the resource identifier:
failing to locate a mapping to the storage resource;
determining a load balancing factor for each storage partition of a plurality of storage partitions;
using the load balancing factors to determine a new storage partition in which a new storage resource should be created and creating the new storage resource in the new storage partition;
mapping the resource identifier to the new storage partition in the resource lookup store; and
sending a location of the new storage partition to the front end server,
wherein determining a load balancing factor for each storage partition comprises:
given n storage partitions, determining the number of mapping counts C for each of the n storage partitions; and
calculating a load balancing factor ($LBF_m$) for each storage partition m using the following:

$$LBF_m = (1/C_m)/(1/C_1 + 1/C_2 + \ldots + 1/C_n).$$

15. The computer-readable storage medium of claim 14, further comprising determining which lookup partitioning service server of a plurality of lookup partitioning service servers will locate the storage partition in response to the resource identifier.

16. The computer-readable storage medium of claim 14, further comprising relocating the storage resource from one storage partition to a different storage partition and updating the mapping of the resource identifier at the lookup partitioning service server.

17. The computer-readable storage medium of claim 14, wherein the load balancing factors are further based on a value selected from the values consisting of: a mapping number and a manual weighting value.

18. The computer-readable storage medium of claim 14, wherein using the load balancing factors to determine a new storage partition comprises:
generating a random number R, where R is a real number between 0 and 1;
ranking the load balancing factors in ascending order;
locating a particular storage partition, where the sum of all the load balancing factors ranked lower than the load balancing factor corresponding to the particular storage partition is less than or equal to R, and the sum of all the load balancing factors ranked lower than the load balancing factor corresponding to the particular storage partition plus the load balancing factor corresponding to the particular storage partition is greater than R.

19. A lookup partitioning server comprising:
a processing unit;
at least one primary lookup partition; and
at least two redundant lookup partitions which mirror two respective different primary lookup partitions stored on other look-up partitioning servers;
a memory configured to store computer-executable instructions configured to manage access to a plurality of storage resources at a plurality of storage servers, the computer-executable instructions performing acts comprising:
receiving a resource identifier associated with a storage resource from a front end server;
utilizing the resource identifier to lookup, in a resource lookup store, a storage partition associated with the resource identifier;
in an event a particular storage partition is associated with the resource identifier:
locating the particular storage partition of a storage server; and
sending a location of the particular storage partition of the storage server to the front end server to grant access to the storage resource; and
in an event no particular storage partition is associated with the resource identifier:
failing to locate a mapping to the storage resource;
determining a load balancing factor for each storage partition of a plurality of storage partitions;
using the load balancing factors to determine a new storage partition in which a new storage resource should be created and creating the new storage resource in the new storage partition;
mapping the resource identifier to the new storage partition in the resource lookup store; and
sending a location of the new storage partition to the front end server,
wherein determining a load balancing factor for each storage partition comprises:
given n storage partitions, determining the number of mapping counts C for each of the n storage partitions; and
calculating a load balancing factor ($LBF_m$) for each storage partition m using the following:

$$LBF_m = (1/C_m)/(1/C_1 + 1/C_2 + \ldots + 1/C_n).$$

20. The lookup partitioning server of claim 19, wherein using the load balancing factors to determine a new storage partition comprises:

generating a random number R, where R is a real number between 0 and 1;

ranking the load balancing factors in ascending order;

locating another particular storage partition, where the sum of all the load balancing factors ranked lower than the load balancing factor corresponding to the another particular storage partition is less than or equal to R, and the sum of all the load balancing factors ranked lower than the load balancing factor corresponding to the another particular storage partition plus the load balancing factor corresponding to the particular storage partition is greater than R.

* * * * *